US008674563B2

(12) United States Patent
Lamouree et al.

(10) Patent No.: US 8,674,563 B2
(45) Date of Patent: Mar. 18, 2014

(54) LINEAR MOTOR SYSTEM

(75) Inventors: John Lamouree, East Patchogue, NY (US); Fred Sommerhalter, Oyster Bay, NY (US); Darius Bobelis, Hauppauge, NY (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/443,240

(22) Filed: Apr. 10, 2012

(65) Prior Publication Data
US 2012/0194006 A1 Aug. 2, 2012

Related U.S. Application Data

(63) Continuation of application No. 12/789,320, filed on May 27, 2010.

(51) Int. Cl.
*H02K 41/03* (2006.01)

(52) U.S. Cl.
USPC ..................................... 310/12.31; 310/12.18

(58) Field of Classification Search
USPC ..................... 310/12.18, 12.19, 12.21, 12.22, 310/12.24–12.26, 12.31–12.33
See application file for complete search history.

(56) References Cited

U.S. PATENT DOCUMENTS

| | | | | | |
|---|---|---|---|---|---|
| 5,175,456 | A | * | 12/1992 | Neff et al. | 310/13 |
| 5,359,245 | A | * | 10/1994 | Takei | 310/12.12 |
| 5,945,824 | A | * | 8/1999 | Obara et al. | 324/207.22 |
| 6,326,708 | B1 | * | 12/2001 | Tsuboi et al. | 310/12.06 |
| 6,348,746 | B1 | * | 2/2002 | Fujisawa et al. | 310/12.24 |
| 6,495,935 | B1 | * | 12/2002 | Mishler | 310/12.04 |
| 6,977,450 | B2 | * | 12/2005 | Asou et al. | 310/12.31 |
| 7,456,526 | B2 | * | 11/2008 | Teramachi et al. | 310/12.21 |
| 7,683,749 | B2 | * | 3/2010 | Yajima et al. | 335/222 |
| 2008/0157607 | A1 | * | 7/2008 | Scheich et al. | 310/12 |

* cited by examiner

*Primary Examiner* — Tran Nguyen
*Assistant Examiner* — Naishadh Desai
(74) *Attorney, Agent, or Firm* — Fletcher Yoder, P.C.; R. Scott Speroff; John M. Miller

(57) ABSTRACT

A linear motor system is provided includes a coil assembly, a magnet assembly, and a bearing assembly disposed between the coil and magnet assemblies to allow movement of one or both of them. The bearing assembly includes a single bearing rail that can be mounted on either side of the magnet assembly. The rail has elongated recesses that receive bearing elements. A stage structure may be attached to the assembly, such at to the magnet assembly, to move a machine component along the rail.

15 Claims, 3 Drawing Sheets

LINEAR MOTOR SYSTEM

CROSS REFERENCE TO RELATED APPLICATIONS

This application is a continuation of U.S. patent application Ser. No. 12/789,320, entitled "Sealed Linear Motor System", filed May 27, 2010, which is herein incorporated by reference.

BACKGROUND

The invention relates generally to linear motors, and particularly to a linear motor system with a single bearing rail for ease of assembly and improved performance.

Linear motors are known in the art and are used in a variety of applications such as machining, robotic positioning and food processing and packaging applications. One type of a linear motor system includes stationary armatures having coils and movable stages containing magnets. Typically, the armature windings may be mounted to a base plate and a stage with a series of magnets is free to move on the base plate. The stage is guided in a desired direction by applying AC or DC excitation to the coils. Another type of linear motor system includes stationary magnets and moving coils.

In certain applications, the linear motor systems may be subjected to loads that may cause stresses on alignment structures of the motor systems. For example, side loading may occur that can cause bearings to exert forces on guide rails and other structures in ways that may lead to early wear and limit the life of the motors. Moreover, many linear motor systems comprise a pair of rails or guides that bear such side loading. These must generally be aligned with one another to avoid unwanted excessive side loading that can similarly lead to accelerated wear and limit life. Careful alignment of parallel rails of this type can be demanding during manufacturing and assembly.

Accordingly, it would be desirable to develop a linear motor system that can be employed in applications where side and other loading is anticipated.

BRIEF DESCRIPTION

Briefly, according to one embodiment of the present invention, a sealed linear motor system is provided. The sealed linear motor system includes a sealed coil assembly having a plurality of coil windings within a base plate and comprising covers disposed about the base plate and coil windings to prevent moisture and/or chemical ingress into the base plate and the coil windings. The sealed linear motor system also includes a sealed magnet assembly disposed adjacent to the coil assembly and comprising a plurality of magnets mounted on a magnet mounting plate and a magnet housing disposed on a surface of the magnet mounting plate to cover and seal the plurality of magnets within the housing.

In accordance with another aspect, a sealed linear motor system is provided. The sealed linear motor system includes a sealed coil assembly having a plurality of coil windings within a base plate and comprising covers disposed about the base plate and coil windings to prevent moisture and/or chemical ingress into the base plate and the coil windings. The sealed linear motor system also includes a sealed magnet assembly disposed adjacent to the coil assembly and comprising a plurality of magnets mounted on a magnet mounting plate and a magnet housing disposed on a surface of the magnet mounting plate to cover and seal the plurality of magnets within the housing. The sealed linear motor system further includes a motor stage structure secured to the coil assembly or to the magnet assembly and configured to receive a movable machine component and a bearing assembly coupled between the coil assembly or the magnet assembly and the motor stage structure and configured to facilitate linear motion of the magnet assembly relative to the coil assembly.

In accordance with another aspect, a sealed linear motor system is provided. The sealed linear motor system includes a sealed coil assembly having a plurality of coil windings within a base plate and comprising covers disposed about the base plate and coil windings to prevent moisture and/or chemical ingress into the base plate and the coil windings. The sealed linear motor system also includes a sealed magnet assembly disposed adjacent to the coil assembly and comprising a plurality of magnets mounted on a magnet mounting plate and a magnet housing disposed on a top surface of the magnet mounting plate to cover and seal the plurality of magnets within the housing. Further, the sealed linear motor system includes at least one encoder sensor sealed within the coil assembly and configured to sense position and/or motion information of the magnet assembly.

In accordance with another aspect, a sealed linear motor system is provided. The sealed linear motor system includes a sealed coil assembly having a plurality of coil windings within a base plate and including covers disposed about the base plate and coil windings to prevent moisture and/or chemical ingress into the base plate and the coil windings. The sealed linear motor system includes a sealed magnet assembly disposed adjacent to the coil assembly and comprising a plurality of magnets mounted on a magnet mounting plate and a magnet housing disposed on a top surface of the magnet mounting plate to cover and seal the plurality of magnets within the housing. The sealed linear motor system also includes a sealed sensor assembly disposed adjacent to the magnet assembly and having at least one encoder sensor configured to sense position and/or motion information of the magnet assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function provide a sealed linear motor system for use in applications such as food processing applications, wet installations and chemical laden environments. In particular, the sealed linear motor system includes individually sealed coil and magnet assemblies to prevent moisture and/or chemical ingress within the system.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
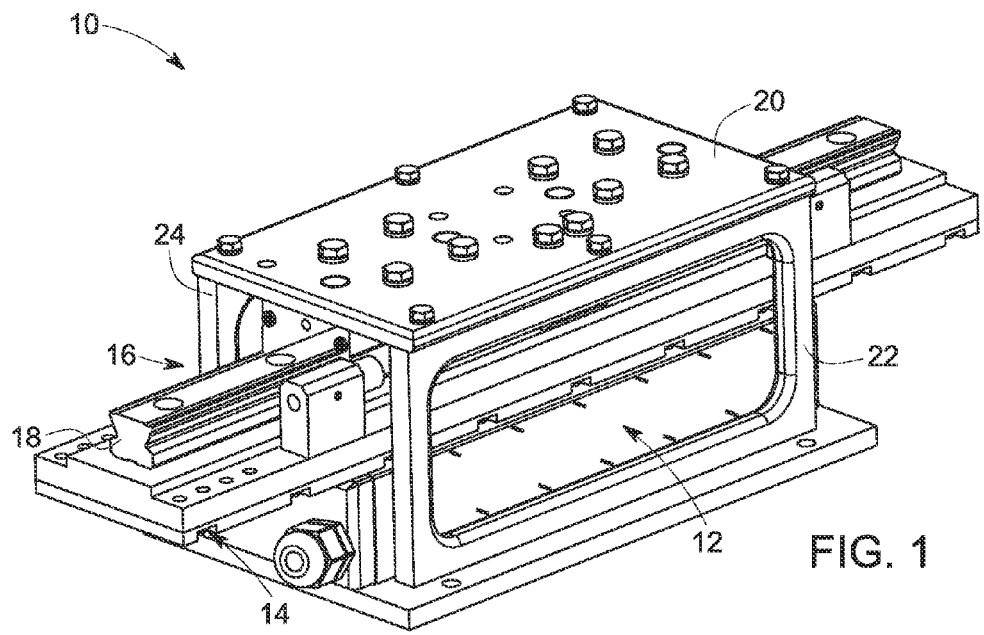
FIG. 1 illustrates a sealed linear motor system in accordance with aspects of the present technique.

Turning now to drawings and referring first to FIG. 1, a sealed linear motor system 10 is illustrated. The system 10 includes a coil assembly 12 and a magnet assembly 14 disposed adjacent to the coil assembly 12. The system 10 further includes a bearing assembly 16 coupled to the magnet assembly 14 and configured to facilitate linear motion of the magnet assembly 14 relative to the coil assembly 12. The coil assembly 12 includes a plurality of sealed coil windings laminated on an iron core. Further, the magnet assembly 14 includes a plurality of magnets covered by shrouds.

In operation, the coil assembly 12 is configured to receive power from a power source (not shown in FIG. 1) such as a three-phase power supply. The bearing assembly 16 includes a rail 18 that facilitates movement of the magnet assembly 14 along the coil assembly 12. This bearing assembly 16 may include two or more bearing elements (not shown) that engage elongated recesses in the rail 18 to hold the magnet assembly 14 on the coil assembly 12, while allowing it to move along the coil assembly 12. A controlled magnetic field produced by the coil assembly 12 acts on the magnet assembly 14 to produce a linear force for driving the magnet assembly 14 and any external load secured to it.

In the illustrated embodiment, the system 10 includes a top plate 20 to secured to the magnet assembly 14. Further, the system 10 also includes side supports such as represented by reference numerals 22 and 24 to link the top plate 20 to any other support structures, such as a lower support plate.

In the illustrated embodiment, each of the coil assembly 12, the magnet assembly 14 and the bearing assembly 16 have an environmentally protected design as will be described in detail below. Moreover, the materials for each of these components are selected for use in environments such as wet installations, chemical laden environments, among others. In a presently contemplated embodiment, the external shells of the assemblies are made of stainless steel.

It should also be noted that the arrangement shown in FIG. 1 may be referred to as a motor stage. The plates and supports associated with the linear motor may take various forms in such a motor stage, but are typically designed to support a moving component. That is, in an embodiment in which the coil assembly 12 is stationary, it will be secured to a machine and powered by an external power source (such as three-phase power supplied via any desired switchgear, circuit breakers, and so forth. The power may be controlled to regulate movement of the magnet assembly 14 along the coil assembly 12 via the bearing rail. The moving machine component, secured to the stage, such as via fasteners interfacing with the supports around the magnet assembly may thus be made to move to desired locations. The stage may be used for a wide variety of operations, such as pick-and-placement, material handling, containing forming, just to mention a few.

Furthermore, it should be noted that in the illustrated embodiment, the coil assembly 12 is designed to be stationary, while the magnet assembly 14 moves along it. The arrangement may be reversed, such that a sealed coil assembly 12 moves along a sealed magnet assembly 14. In such cases, the two assemblies 12 and 14 may be sealed with techniques such as those described below.

Still further, the particular stage arrangement may employ various bearing configurations. In the illustrated embodiment, a single bearing rail is provided on the upper side of the coil assembly 12. In other embodiments, the bearing assembly 16 may be provided on the lower side, and other bearing techniques may be used. Similarly, the entire arrangement may be inverted or otherwise positioned, such that either the coil assembly 12 or the magnet assembly 14 may be located on top of the combined structure, or the structure may be positioned at various angles other than horizontal.

In certain exemplary embodiments, the system 10 may include position sensors, such as Hall-effect sensors coupled to the coil assembly 12 for sensing position information of the magnets of the magnet assembly 14. In certain other embodiments, the system 10 may include such sensors in an encapsulated assembly external to the coil assembly 12. The encapsulation of the sensors prevents any moisture ingress into the sensors.

Figure 2:
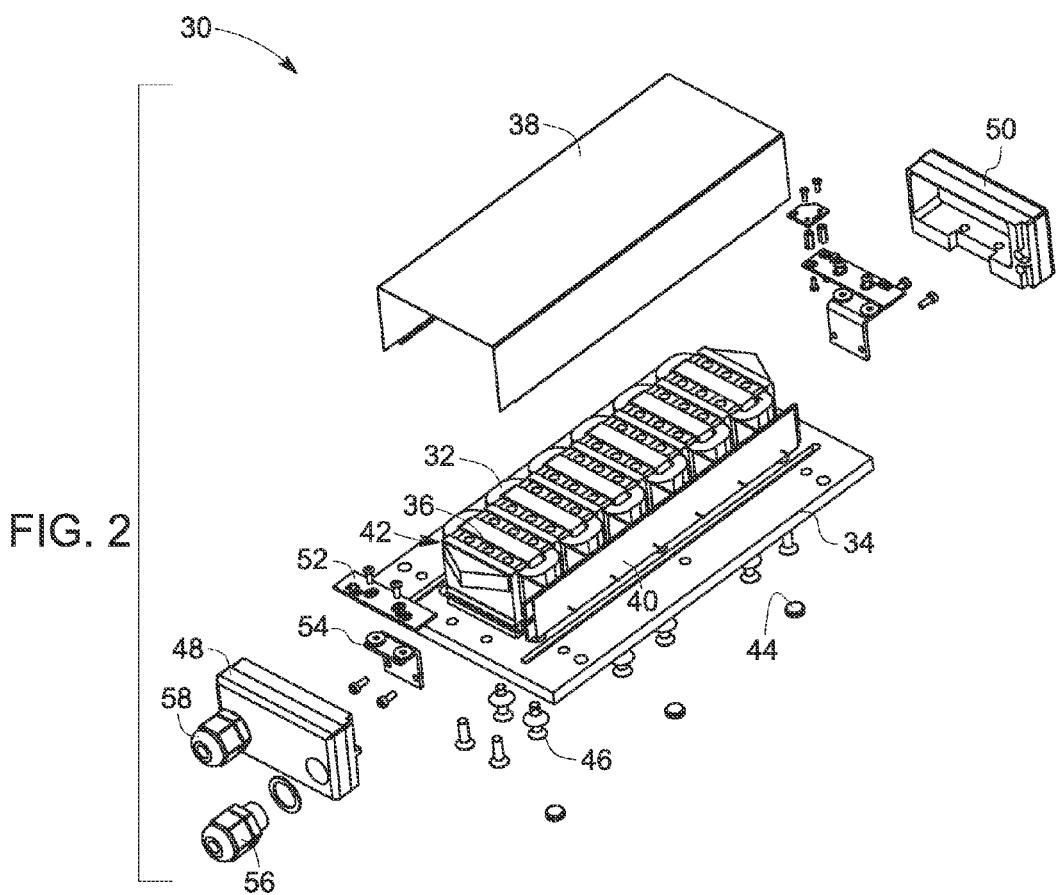
FIG. 2 is an exploded view of the stator assembly of FIG. 1 in accordance with aspects of the present technique.

FIG. 2 is an exploded view 30 of the coil assembly 12 of FIG. 1 in accordance with aspects of the present technique. As illustrated, the coil assembly 30 includes a plurality of coil windings 32 with an iron core laminated over a base plate 34. In this exemplary embodiment, the base plate 34 is made of stainless steel. In the illustrated embodiment, the coil windings 32 are disposed in coil retainers such as represented by reference numeral 36.

The coil assembly 30 further includes a top cover 38 and side covers represented by reference numerals 40 and 42 disposed about the coil windings 32 and the base plate 34. In the illustrated embodiment, the top cover 38 and the side covers 40 and 42 may be bolted to the lamination stack. The top cover 38 and the side covers 40 and 42 are configured to prevent moisture and/or chemical ingress into the base plate 34 and the coil windings 32. In one exemplary embodiment, the top cover 38 and the side covers 40 and 42 are made of stainless steel. However other suitable materials may be employed for the top cover 38 and the side covers 40 and 42.

In this exemplary embodiment, a sealing material is employed to bond and seal the plurality of coil windings 32 to the base plate 34. In one exemplary embodiment, the sealing material includes a resin. In this exemplary embodiment, the sealing material includes thermal conducting epoxy such as manufactured and marketed by Emerson & Cummings Stycast that is commercially available in the market. The base plate 34 includes a plurality of grooves and encapsulation plugs such as represented by reference numeral 44 for sealing the coil windings 32 with the sealing material. Furthermore, sealing washers 46 are disposed on the base plate to prevent leakage of moisture and/or chemicals into the coil windings 32 and the base plate 34. In this exemplary embodiment, the sealing washers 46 include nylon.

The coil assembly 34 further includes end caps 48 and 50 disposed on both ends of the coil windings 32. In this exemplary embodiment, the end cap 48 includes components for facilitating electrical connections of the coil assembly 30 with a power supply and/or a controller. Where an internal encoder sensor is provided, as in the illustrated embodiment, two such electrical connections may be provided, one dedicated to supplying power, and the other for conducting sensed position signals. Both connections are sealed.

The coil assembly 34 further includes a printed circuit board 52 having at least one encoder sensor for sensing position and/or motion information of the magnet assembly 14 (see FIG. 1). As will be appreciated by those skilled in the art, the sensed signals may be processed (at least partially) within the coil assembly 12, or fully by external circuitry. In either case, position signals may be used to derive velocity signals and acceleration signals, where desired, and any such signals may be used as feedback to accurately position and move the stage as needed in the particular application.

The printed circuit board 52 may be coupled to the base plate 34 using any suitable connecting arrangement. In this exemplary embodiment, a bracket 54 is employed to connect the printed circuit board 52 to the base plate 34. In this example embodiment, the at least one encoder sensor includes an analog Hall-effect sensor mounted on the surface mounted printed circuit board 52.

As will be appreciated by those skilled in the art, the coil assembly 34 may include other suitable components such as sealed cable connectors 56 and 58 for facilitating connection with a power supply and a controller respectively.

As can be seen, the components of the coil assembly 32, such as the coils 32, the base plate 34 and the printed circuit board 52 with the encoder sensors are sealed using corrosion resistant materials in a stainless steel housing. Further, the coil assembly 32 is fully encapsulated and sealed with epoxy matrix to prevent ingress of moisture and/or chemicals into the coil assembly 32.

Figure 3:
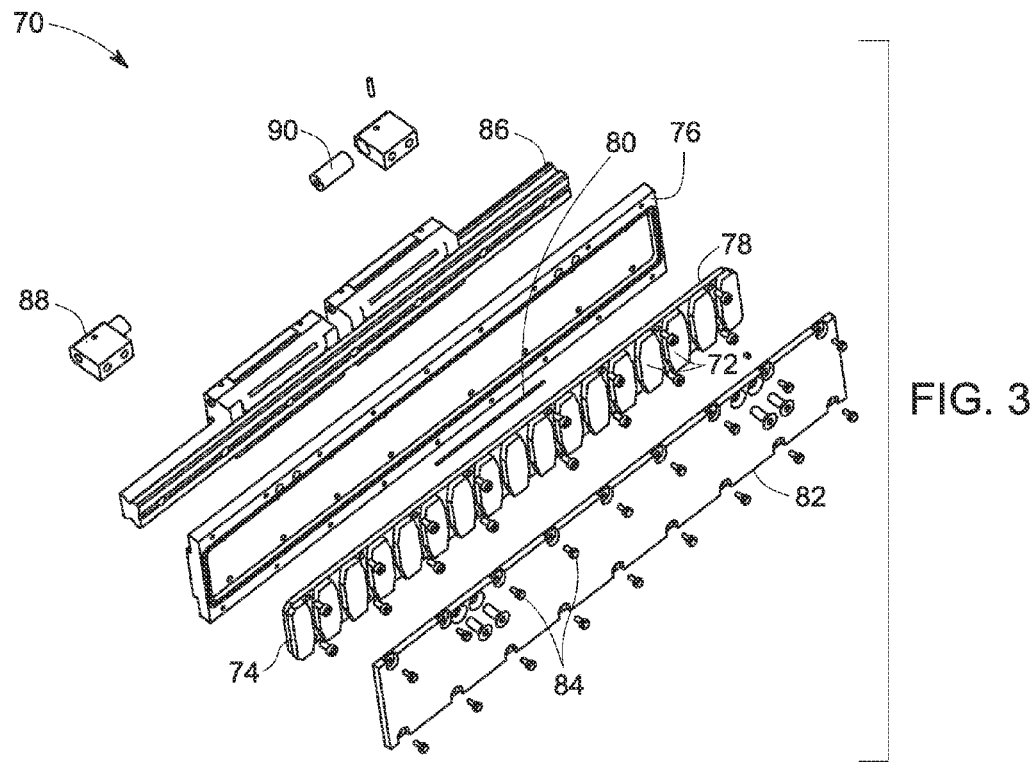
FIG. 3 is an exploded view of the magnet assembly of FIG. 1 in accordance with aspects of the present technique.

FIG. 3 is an exploded view 70 of the magnet assembly 14 of FIG. 1 in accordance with aspects of the present technique. As illustrated, the magnet assembly 70 includes a plurality of magnets such as represented generally by reference numeral 72, mounted on a magnet mounting plate 74. The magnets 72 may be mounted on the magnet mounting plate 74 using a suitable adhesive. A magnet housing 76 is disposed on a top surface 78 of the magnet mounting plate 74 to cover the plurality of magnets 72. In this exemplary embodiment, each of the magnet mounting plate 74 and the magnet housing 76 is made of stainless steel.

The magnet assembly 70 further includes a sealing material configured to place and seal the magnet mounting plate 74 and the magnet housing 76. In one exemplary embodiment, the sealing material is an elastomer. In the illustrated embodiment, O-ring seal is disposed between the magnet mounting plate 74 and the magnet housing 76.

The magnet mounting plate 74 may include grooves for laying a O-ring seal 80 between the magnet mounting plate 74 and the magnet housing 76. In certain embodiments, the O-ring seal comprises elastomers such as ethylene propylene, fluorocarbon, neoprene, nitrile and silicone.

In certain embodiments, the sealed magnet assembly 70 may be mounted to an external mounting plate 82 via fasteners such as represented by reference numeral 84. In the illustrated embodiment, the magnet assembly 70 also includes a linear guide 86, corresponding to rail 18 shown in FIG. 1, configured to facilitate the movement of the magnet assembly 70.

In this exemplary embodiment, the magnet assembly 70 further includes a magnetic encoder scale (not shown) mounted to the magnet assembly 70. The magnetic encoder scale is configured to produce an output corresponding to the position and/or motion information of the magnet assembly 70. In the illustrated embodiment, the magnet assembly 70 includes other suitable components such as block stops 88 and 90 for controlling the movement of the magnet assembly 70. As can be seen, the magnet assembly 70 with the plurality of magnets 72 and the magnetic encoder scale are sealed in stainless steel housing, thereby protecting the magnets 72 from moisture and/or chemicals during wash down operations such as required in food processing and other applications.

Figure 4:
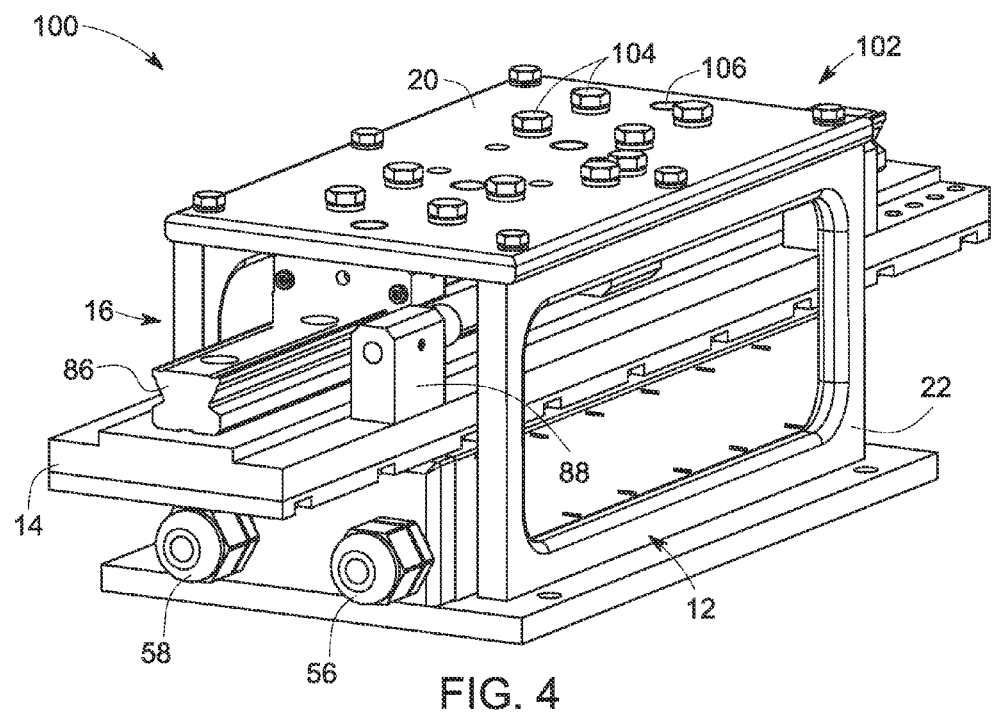
FIG. 4 is a perspective view of the sealed linear motor system of FIG. 1 in accordance with aspects of the present technique.

FIG. 4 is a perspective view 100 of the sealed linear motor system 10 of FIG. 1. As illustrated, the system 100 includes the coil assembly 12, the magnet assembly 14 and the bearing assembly 16 disposed within a stage support steel housing 102. As described before, each of these components employ corrosion proof materials such as stainless steel.

In the illustrated embodiment, the stage support housing 102 includes a motor stage structure configured to receive a movable machine component. The motor stage structure includes the top plate 20 and the side supports 22 and 24 configured to support the top plate 20. The top plate 20 is coupled to the bearing assembly 16 and the side supports 22 and 24 through fasteners 104 such as through a screw and washer arrangement. As illustrated, the top plate 20 and the side supports 22 and 24 provide structural integrity of the system 100 while providing supports for the coils 32 (in the coil assembly 12) and magnets 72 in the magnet assembly 14. The top plate 20 further includes encapsulation plugs such as represented by reference numeral 106 for sealing the system 100 using a sealing material.

In the illustrated embodiment, the bearing assembly 16 includes the linear guide 86 and other components such as bearings to guide the movement of the magnet assembly 14. Further, the bearing assembly 16 also includes the block stop such as represented by reference numeral 88 for controlling the movement of the magnet assembly 14. The system 100 also includes other suitable components like the cable connectors 56 and 58 for connection of electrical cables while providing strain relief at the connection points.

In certain embodiments, the components of the coil assembly 12, the magnet assembly 14 and the bearing assembly 16 are passivated and electropolished thereby resulting in a smooth surface to facilitate wash down of the components. In the illustrated embodiment, the components of the system 100 are assembled with suitable clearances and air gaps between the parts to facilitate minimum build-up of material in the system 100 for easy wash down of such components.

Furthermore, compliant sealing materials such as elastomers are utilized to seal such components. The bearing assembly 16 may include stainless steel bearings and food grade grease. Moreover, the components are assembled to avoid any possible water traps in the assembly of the sealed linear motor system 100. In the illustrated embodiment, the interior spaces of the coil assembly 12 and the magnet assembly 14 are filled with a potting material after the components are assembled. In this exemplary embodiment, the assembly is sealed using thermal conducting epoxy.

As can be seen, the individually sealed components such as the coil assembly 12 and the magnet assembly 14 along with other components of the sealed linear motor system 100 are protected from moisture and/or chemical ingress within the housing 102 with the top plate 20, side supports 22 and 24 and the sealing material.

Figure 5:
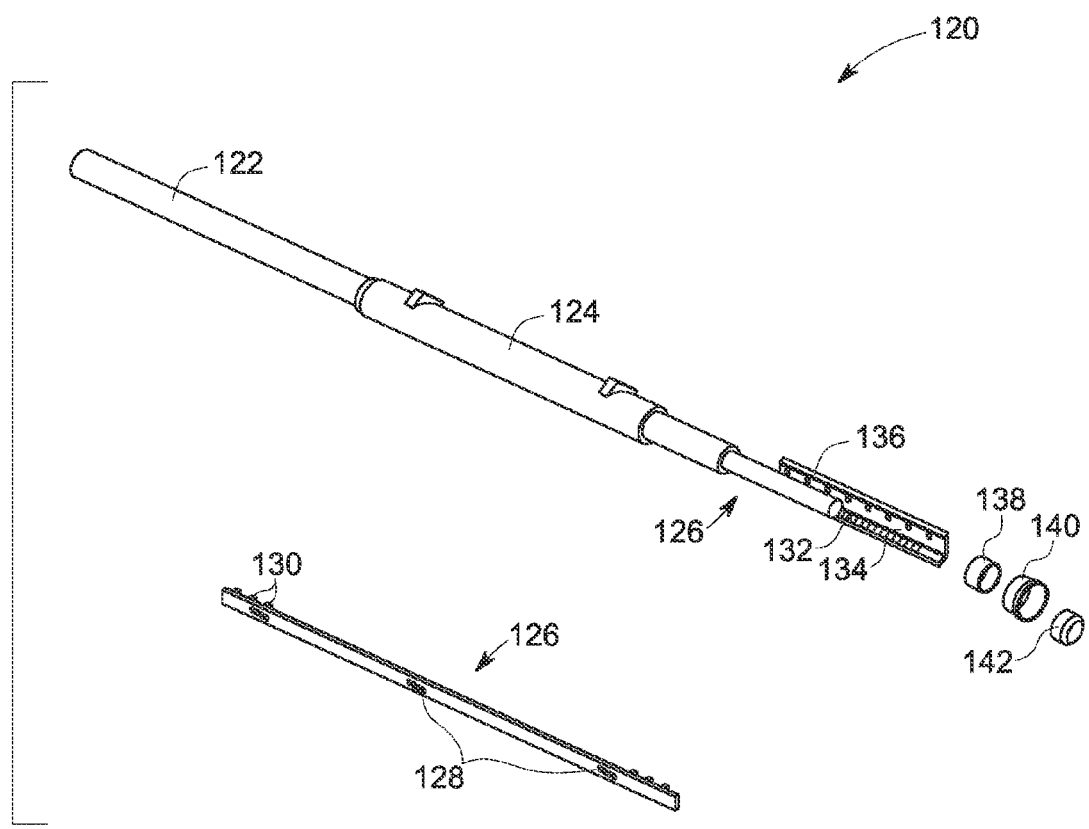
FIG. 5 illustrates an exemplary configuration of an encapsulated sensor assembly employed in the sealed linear motor system of FIG. 4.

In certain embodiments, the sealed linear motor system 100 may include encoder sensors in an encapsulated assembly external to the coil assembly 12. The encapsulation of the sensors prevents any moisture ingress into the sensors. FIG. 5 illustrates an exemplary configuration 120 of an encapsulated sensor assembly. The sensor assembly 120 includes a stationary enclosure 122. Further, the sensor assembly 120 includes a movable enclosure 124 disposed about the stationary enclosure 122 with the magnet assembly.

In the illustrated embodiment, each of the stationary and movable enclosures 122 and 124 is made of stainless steel. The stationary enclosure 122 includes a printed circuit board 126 having encoder sensor arrays such as represented by reference numerals 128 for sensing position and/or motion information. In addition, the printed circuit board 126 includes Hall effect magnetic commutators represented by reference numeral 130.

The sensor assembly 120 further includes encoder magnets 132 and commutation magnets 134. In addition, the sensor assembly 120 includes a magnet mounting bar 136 that moves along with the movable enclosure 124. The sensor assembly 120 further includes other suitable components such as a linear guide bushing 138, an end cap 140 and a linear seal 142 for sealing the end of the assembly 120. It should be noted that the components described above may be made of suitable corrosion resistant materials.

As will be appreciated by those skilled in the art, the sensed signals from the sensor assembly 120 may be processed (at least partially) via a processing circuitry within the assembly 120, or fully by external circuitry. The sensor assembly 120 may be coupled to the linear motor system 100 using any suitable coupling mechanism. In one exemplary embodiment, the sensor assembly 120 is bolted to the linear motor system 100. In certain embodiments, the sensor assembly 120 includes integral wipers and self aligning guide bearings. In the illustrated embodiment, interior spaces of the sensor assembly 120 are filled with a potting material.

The various aspects of the structures described hereinabove may be used for sealing linear motor systems for use in high pressure wash down or in wet environments. As described above, the technique utilizes sealing features and materials for preventing moisture ingress from high pressure wash down thereby allowing use of such systems in wet applications and in applications with hostile environments such as explosive environments. As will be appreciated by those skilled in the art, the use of such sealing mechanisms substantially enhances the survivability and reliability of such linear motor systems in wet installations, chemical laden environments and explosive environments.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A linear motor system, comprising:
a generally planar coil assembly having a plurality of coil windings;
a generally planar movable magnet assembly having two opposed major faces, one major face being disposed adjacent to the coil assembly, and comprising a plurality of magnets; and
a bearing assembly coupled to facilitate movement of one of the magnet assembly and the coil assembly with respect to the other, the bearing assembly comprising a single bearing rail, wherein the single bearing rail is a separate component from the coil assembly and the magnet assembly and is mounted to the magnet assembly on a major face thereof opposite the major face thereof adjacent to which the coil assembly is disposed, and wherein the single bearing rail is narrower than the coil assembly and the magnet assembly, and wherein the single bearing rail further comprises two elongated recesses generally concave in an outward direction on opposite sides of the single bearing rail thereof.

2. The linear motor system of claim 1, comprising bearing elements configured to engage the elongated recesses to hold the magnet assembly on the coil assembly while allowing linear movement.

3. The linear motor system of claim 1, comprising stops for limiting motion of the magnet assembly or the coil assembly.

4. The linear motor system of claim 1, comprising a stage structure secured to one of the magnet assembly and the coil assembly and configured to move therewith along the single bearing rail.

5. The linear motor system of claim 4, wherein the stage structure is secured to the magnet assembly.

6. The linear motor system of claim 4, wherein the stage structure comprises interface features configured to support a machine component movable with the stage structure.

7. A linear motor system, comprising:
a generally planar coil assembly having a plurality of coil windings within a base plate;
a generally planar movable magnet assembly having two opposed major faces, one major face being disposed adjacent to the coil assembly, and comprising a plurality of magnets mounted on a magnet mounting plate and a magnet housing disposed on a surface of the magnet mounting plate to cover the plurality of magnets;
a motor stage structure secured to the coil assembly or to the magnet assembly and configured to receive a movable machine component; and
a bearing assembly coupled between the magnet assembly and the motor stage structure and configured to facilitate linear motion, the bearing assembly comprising a single bearing rail, wherein the single bearing rail is a separate component from the coil assembly and the magnet assembly and is mounted to the magnet assembly on a major face thereof opposite the major face thereof adjacent to which the coil assembly is disposed, and wherein the single bearing rail is narrower than the coil assembly and the magnet assembly, and wherein the single bearing rail further comprises two elongated recesses generally concave in an outward direction on opposite sides of the single bearing rail thereof.

8. The linear motor system of claim 7, wherein the motor stage structure comprises a plate configured to cover the coil assembly, the magnet assembly, and the bearing assembly; and side supports secured to support the plate.

9. The linear motor system of claim 7, comprising bearing elements configured to engage the elongated recesses to hold the magnet assembly on the coil assembly while allowing linear movement.

10. A linear motor system, comprising:
a generally planar stationary coil assembly having a plurality of coil windings;
a generally planar movable magnet assembly having two opposed major faces, one major face being disposed adjacent to the coil assembly, and comprising a plurality of magnets; and
a bearing assembly coupled to facilitate movement of one of the magnet assembly and the coil assembly with respect to the other, the bearing assembly comprising a single bearing rail secured to the magnet assembly on a major face thereof opposite the major face thereof adjacent to which the coil assembly is disposed, and comprising two elongated recesses generally concave in an outward direction on opposite sides of the single bearing rail thereof, the bearing assembly further comprising bearing elements configured to engage the elongated recesses to hold the magnet assembly on the coil assembly while allowing linear movement, wherein the single bearing rail is a separate component from the coil assembly and the magnet assembly, and wherein the single bearing rail is narrower than the coil assembly and the magnet assembly.

11. The linear motor system of claim 10, comprising stops for limiting motion of the magnet assembly.

12. The linear motor system of claim 10, comprising a stage structure secured to the magnet assembly and configured to move therewith along the single bearing rail.

13. The linear motor system of claim 12, wherein the stage structure comprises interface features configured to support a machine component movable with the stage structure.

14. A linear motor system, comprising:
a generally planar coil assembly having a plurality of coil windings;
a generally planar movable magnet assembly having two opposed major faces, one major face being disposed adjacent to the coil assembly, and comprising a plurality of magnets mounted on a magnet mounting plate and a magnet housing disposed on a surface of the magnet mounting plate to cover the plurality of magnets; and
a bearing assembly coupled to facilitate movement of one of the magnet assembly and the coil assembly with respect to the other, the bearing assembly comprising a single bearing rail, wherein the single bearing rail is a separate component from the coil assembly and the magnet assembly and is mounted to the magnet assembly on a major face thereof opposite the major face thereof adjacent to which the coil assembly is disposed, and wherein the single bearing rail comprises two elongated recesses generally concave in an outward direction on opposite sides of the single bearing rail thereof.

15. A linear motor system, comprising:
a sealed coil assembly having a plurality of coil windings within a base plate and comprising covers disposed about the base plate and coil windings;
a generally planar movable sealed magnet assembly having two opposed major faces, one major face being disposed adjacent to the coil assembly, and comprising a plurality of magnets mounted on a magnet mounting plate and a magnet housing disposed on a surface of the magnet mounting plate to cover and seal the plurality of magnets within the housing; and
a bearing assembly coupled to facilitate movement of one of the sealed magnet assembly and the sealed coil assembly with respect to the other, the bearing assembly comprising a single bearing rail, wherein the single bearing rail is mounted to the magnet assembly on a major face thereof opposite the major face thereof adjacent to which the coil assembly is disposed, and wherein the single bearing rail comprises two elongated recesses generally concave in an outward direction on opposite sides of the single bearing rail thereof.

\* \* \* \* \*